(12) United States Patent
Hodgson

(10) Patent No.: US 12,198,566 B2
(45) Date of Patent: Jan. 14, 2025

(54) POINTER READING TOOL

(71) Applicant: Dean Alan Hodgson, Bradford (GB)

(72) Inventor: Dean Alan Hodgson, Bradford (GB)

( * ) Notice: Subject to any disclaimer, the term of this patent is extended or adjusted under 35 U.S.C. 154(b) by 564 days.

(21) Appl. No.: 17/542,364

(22) Filed: Dec. 4, 2021

(65) Prior Publication Data

US 2023/0177975 A1    Jun. 8, 2023

(51) Int. Cl.
*G09B 17/04*    (2006.01)
*G09B 17/00*    (2006.01)

(52) U.S. Cl.
CPC ........... *G09B 17/003* (2013.01); *G09B 17/04* (2013.01)

(58) Field of Classification Search
CPC ................................ G09B 17/00; G09B 17/04
See application file for complete search history.

(56) References Cited

U.S. PATENT DOCUMENTS

| | | | | |
|---|---|---|---|---|
| 2,699,748 A * | 1/1955 | Crawford | ............... | B42D 9/008 281/42 |
| 3,381,395 A * | 5/1968 | Bergland | ............... | G09B 17/04 40/352 |
| 6,669,480 B2 * | 12/2003 | Chesters | ............... | G09B 17/02 434/178 |
| 7,056,122 B2 * | 6/2006 | Lockett | ............... | G09B 1/00 40/352 |
| 7,565,759 B1 * | 7/2009 | Brennan | ............... | G09B 17/04 116/235 |
| 8,070,492 B1 * | 12/2011 | McKinnis | ............... | G09B 17/02 434/179 |
| 11,450,228 B2 * | 9/2022 | Chang | ............... | G09B 17/02 |

* cited by examiner

*Primary Examiner* — Kurt Fernstrom

(57) ABSTRACT

Pointer reading tool (20) to read a plurality of words by saccading between a plurality of individual pointers enabling any person to learn and train to read using person eye peripheral vision when reading. Having vertical rigid member (5) with horizontal rigid member (22, 23) extended to the width of a line of text on a page or screen (FIGS. 1H and 1I). Plurality pointer member (11, 7, 6, 9, 13) are vertical from horizontal rigid member (22, 23) in reading mode (FIG. 1A). By reducing saccades, improving person eye peripheral vision to read in groups of words, a reader can read at a better pace with improved focus and better concentration whilst reducing stress, strain and fatigue of the eye when reading.

7 Claims, 5 Drawing Sheets

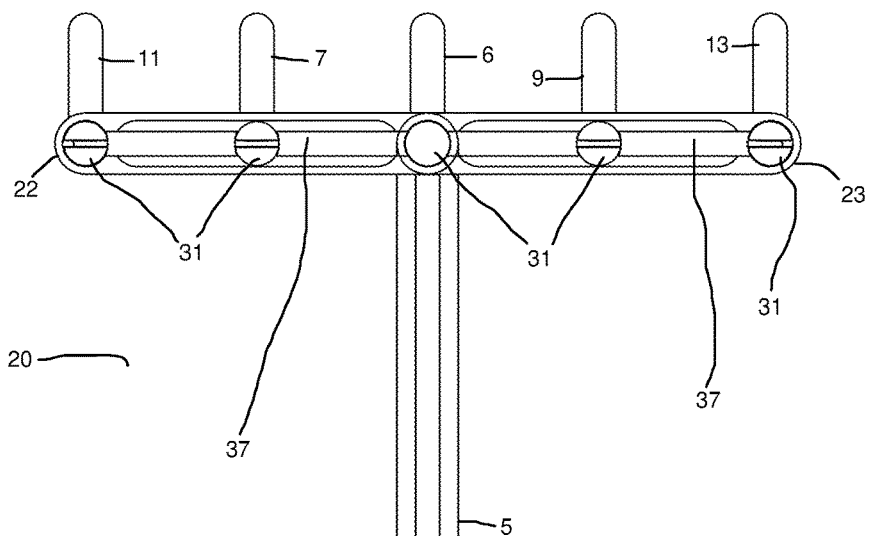
FIG 1A
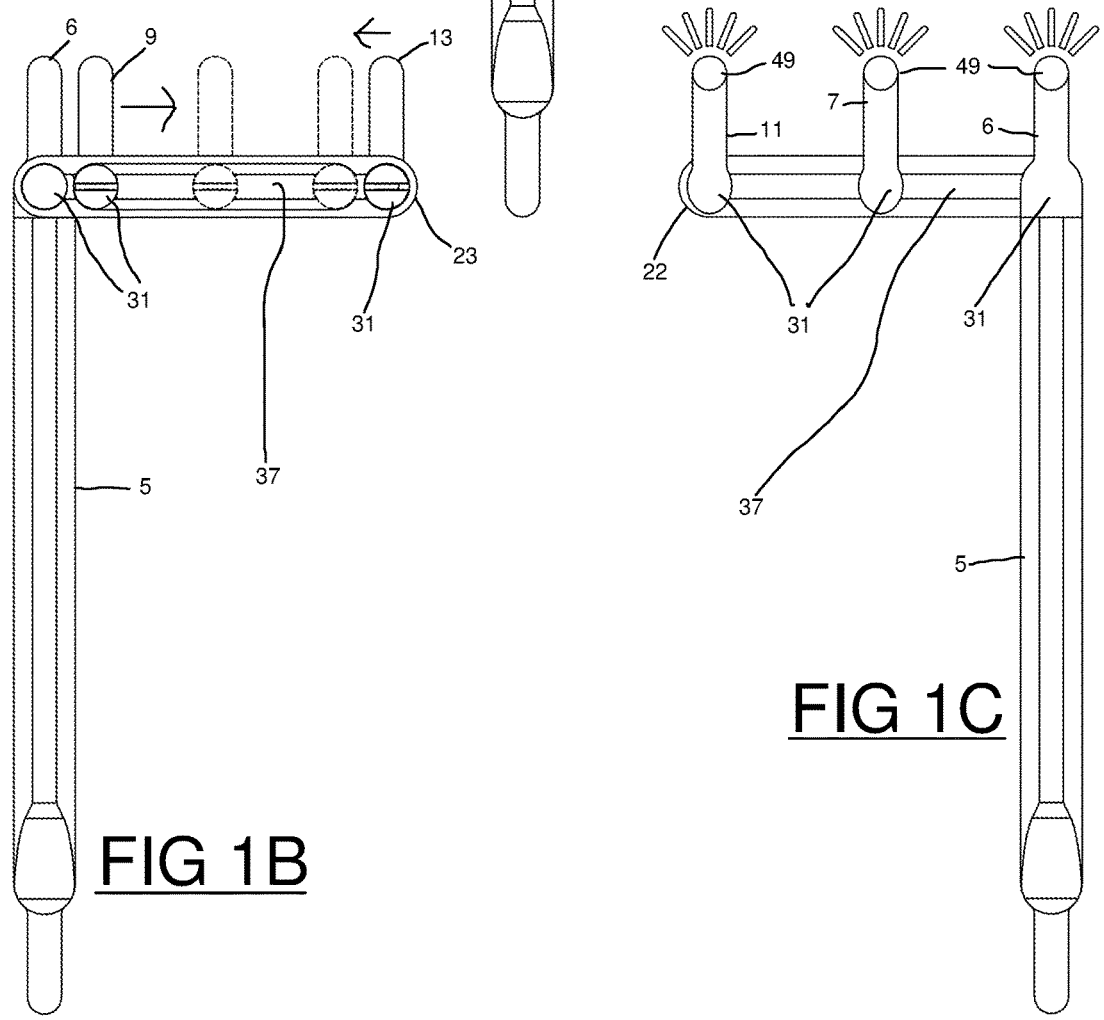
FIG 1B
FIG 1C

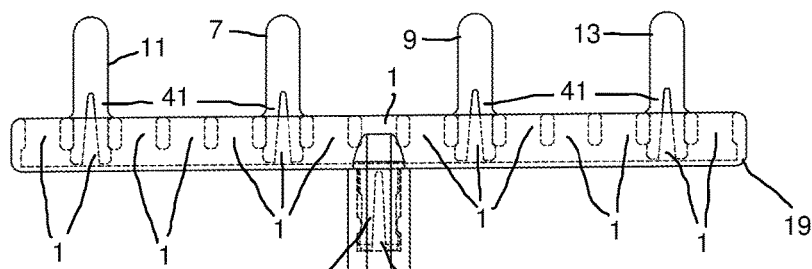
FIG 2A
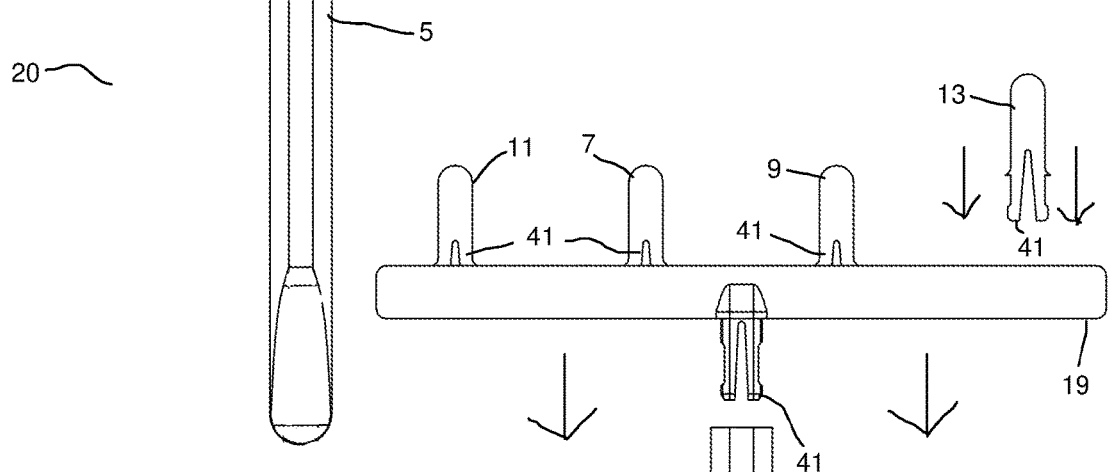
FIG 2B
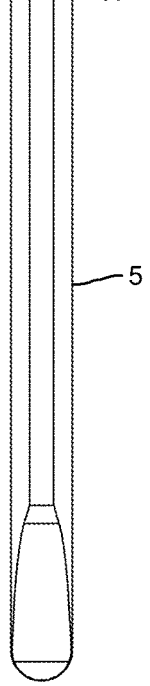

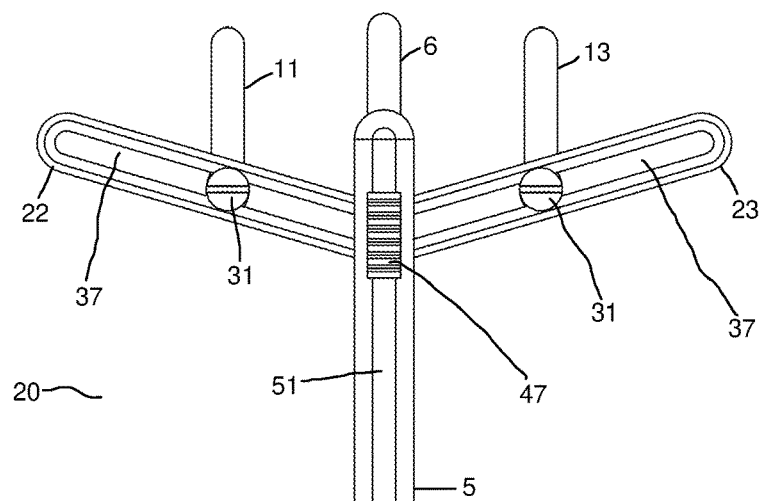
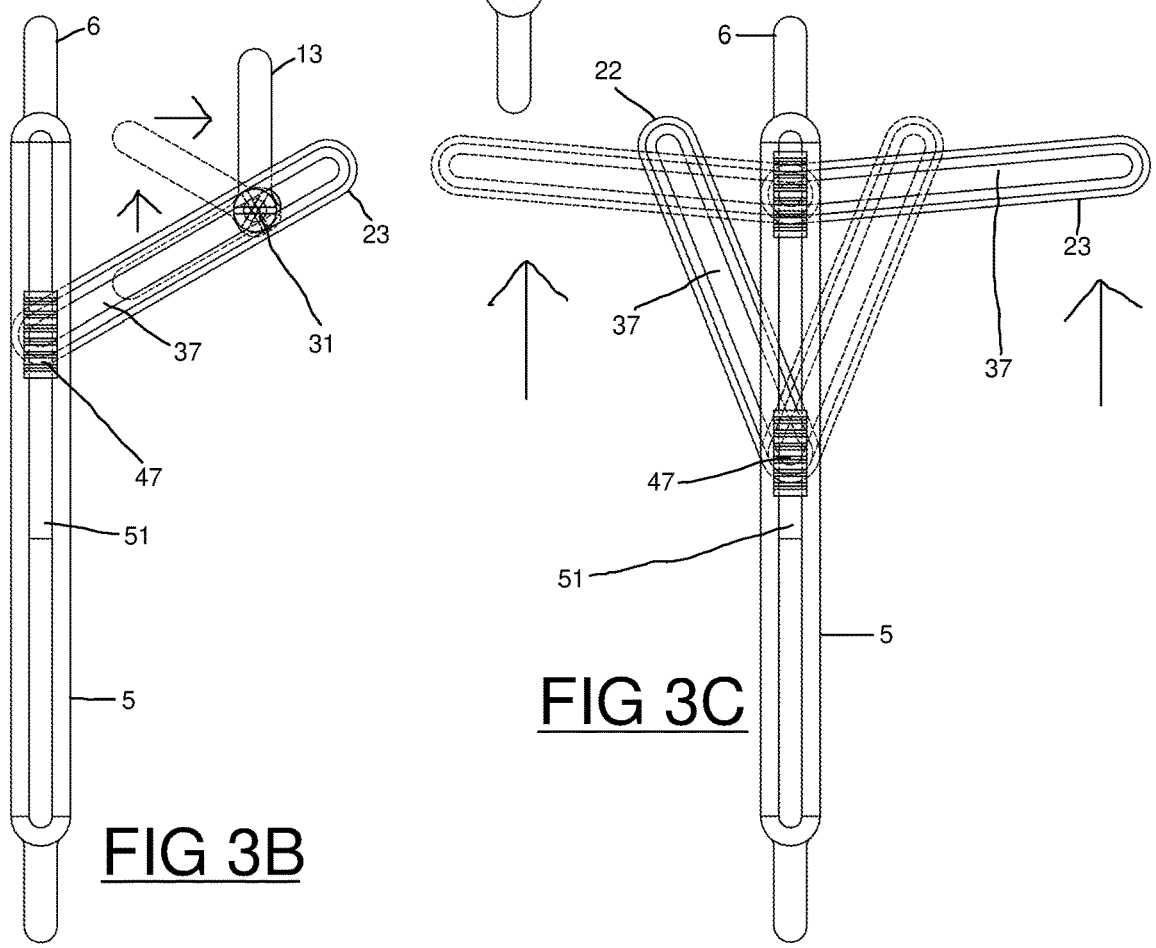
FIG 3A
FIG 3B
FIG 3C

POINTER READING TOOL

BACKGROUND

This invention relates to a pointer reading tool, more specifically to improve readers ability to use eye peripheral vision when reading a group of plurality of words at one individual focused point on a line of text.

Having suffered difficulty reading an ever increasing amount of material in print or on screen. The need to read with pace, accurately and effectively without losing comprehension of material being read is a requirement. From my research, surveys and questionnaires—reading slowly, inaccurately, with reduced comprehension, losing focus and concentration and feeling fatigued are very common problems throughout all ages and abilities of readers.

To understand the main reasons why, we first look at how our eyes work. Each of the eyes sees a slightly different image. The brain, through a process called fusion, blends both images into one picture. Only when eyes have a fixed point, can the eyes come together as a team and fix on said point.

The peripheral vision of the eye allows the eye to see side objects, without the need to turn your head or move your eyes. With peripheral vision when reading, eyes can see up to and including 7 words on either side of a fixed point. To do this a person's eye needs to be trained to read with said peripheral vision. Let me explain how this works, the problems and benefits of why it's important.

When it comes to reading a line of words, eyes have to come together as a team and fix on a word before jumping to the next word. That's called saccades. Saccades is rapid eye movement as it changes from one point to another. Thus how many words on a line equals how many saccades the eyes have to make. For example, ten words on a line equals ten saccades that the eyes have to make (one saccade per word).

The more saccades the eye makes, the more stressed, strained and fatigued eyes become, which then leads to less focus, concentration and comprehension and the reader is more likely not to recall what has been read.

The pace of reading plays a role. To keep the mind engaged with what has been read, the reader has to flow between words. The slower the pace the less concentration a reader has and the mind will start to wonder. To keep the pace when reading to stop the mind from wondering, the person has to read with a pace that flows and is quick enough to keep the concentration on what is being read. This will stop the mind from wondering and concentration will increase.

For our eyes to see each word when reading, eyes have to come together to a point on an individual word. To do this the eye has to be laser-focused to read each individual word on a line. This happens in nanoseconds but to achieve this consistently throughout reading a page of text our eyes through staying laser-focused become stressed, strained and fatigued the more the eye continues reading, leading to reduced focus. Thus if a reader doesn't stay laser-focused, eyes will begin to wonder, randomly jump or jerk and stop. The reader then loses their place, rereads the same words, regresses or jumps whole lines. Comprehension declines which can lead a person to not recall what has been read.

Various controlled reading devices have been proposed to improve reading speed and ability. These and similar devices are somewhat expensive and awkward to use and are largely unsuccessful.

Various other types of reading devices which have slots, windows, viewing areas, unveil or illuminate positions of text on a line at a time, have also been proposed. These are cheaper but awkward to use every day and largely unsuccessful.

Several other speed reading/reading improvement aids have been proposed—for example, EP 1208555 to Minstry (2000), U.S. Pat. No. 5,338,201 to Levine (1993) and a non-patent course called "speed reading". Although prior art is inexpensive to manufacture, the devices have largely been unsuccessful. With users having to manually move devices, pushing devices through every line of text, reading every individual word on a page to the end of the line. This movement can be somewhat physically awkward and tiring and somewhat distracting to the reader. Although the devices offer a pointer for eyes to fix on and flow between, a person's eyes are having to read each individual word, thus causing stress, strain and fatigue to the eyes when reading. In the "Speed reading" course you are taught to improve reading speed by using your finger. With the reader having to move their finger from the beginning of the line reading every individual word, to the end of the line. This movement can be somewhat awkward and tiring and can be distracting to a reader. Although it offers a pointer for eyes to fix on and flow between, eyes are having to read each individual word, thus causing stress, strain and fatigue to the eyes.

BRIEF SUMMARY

In accordance with one embodiment, I provide a pointer reading tool according to claim 1. Thus by using the invention a user will learn and be trained to use eye peripheral vision to read a group of plurality of words on a line in one fixed point. By focusing on a reduced amount of fixed points on a line, using the eyes full peripheral vision to read a group of plurality of words, a user will lower saccades when reading a line of text. The more trained eye peripheral vision becomes the fewer fix points on a line a user will focus on and by lowering fixed points to focus on by not having to saccade between each individual word, will increase pace, focus and concentration when reading and reduce stress, strain and fatigue of eyes.

Advantages

Accordingly several advantages of one or more aspects of the pointer reading tool as follows: to provide a plurality of individual pointers to focus on and saccade between when reading a page of text, that will learn and train the reader to use eye peripheral vision around each individual pointer, that is easy to use, that can be easily manufactured, can be used on any line of text, is changeable and reusable to any reading material, any ability can learn, trains the eye to use peripheral vision when reading, is hand-held and can travel with one's reading material. Other advantages of one or more aspects will be apparent from a consideration of the drawings and ensuing description.

BRIEF DESCRIPTION OF DRAWINGS

In the drawings closely related figures have the same number but different alphabetic suffixes.

FIG. 1A is a perspective view of the first embodiment set in reading position.

FIGS. 1B to 1G shows the perspective view of various movable parts of the first embodiment.

FIG. 2A shows the perspective view of alternate embodiment set in reading position.

FIG. 2B shows the perspective view of various movable parts of FIG. 2A.

FIG. 3A shows the perspective view of additional embodiment set in reading position.

FIG. 3B to 3C shows the perspective view of various movable parts of FIG. 3A.

Figure 1D:
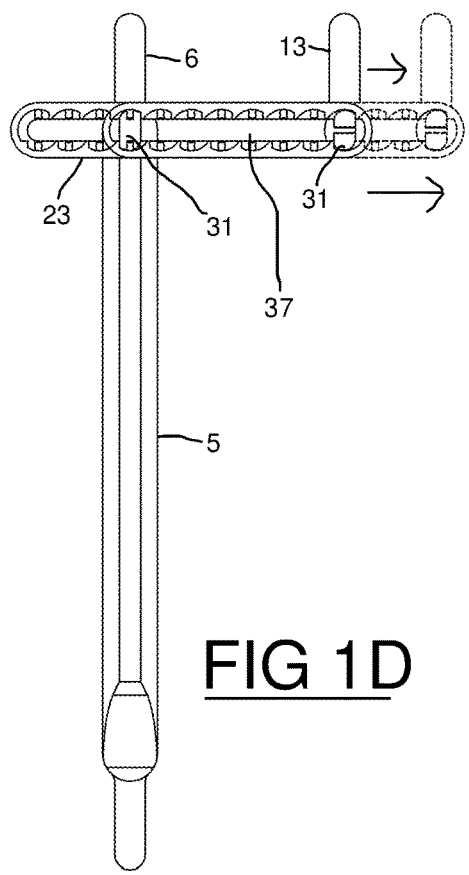

DRAWINGS—REFERENCE NUMERALS 20 pointer reading tool
5 vertical rigid member
7 plurality pointer member
6 plurality pointer member
9 plurality pointer member
11 plurality pointer member
13 plurality pointer member
22 horizontal rigid member
23 horizontal rigid member
31 pivot
19 horizontal fixed member
41 snap-fit
37 slidably
1 slot
43 book
45 digital screen
49 illuminating light
47 cam lock
51 slidably

DETAILED DESCRIPTION—FIGS. 1A to 1I

Figure 1E:
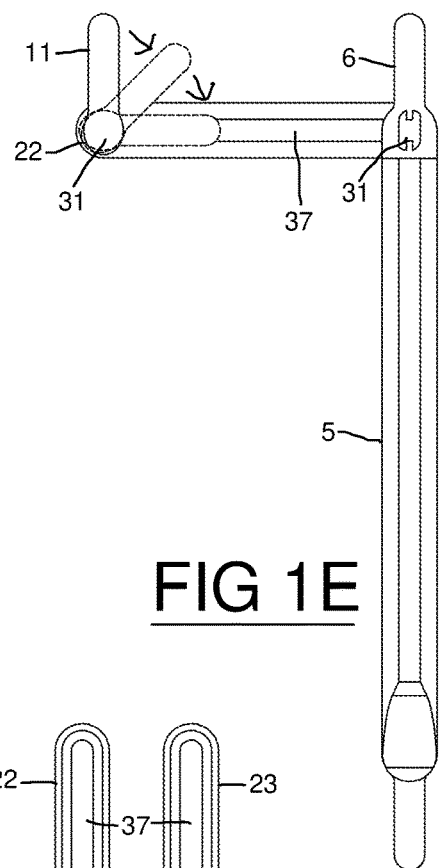

One embodiment of the pointer reading tool 20 is illustrated in FIG. 1A (front perspective view) and shown in set reading position. The pointer reading tool has a vertical rigid member 5 with a semi circle shape and is made out of plastic, however it can be of different shapes such as rectangular, triangle, arrow etc and different materials such as wood, metal etc and connected with pivot 31 however it can be of different pivot such as snap-fit, cam lock, magnet, nut and bolt etc. Horizontal rigid member 22 and 23 are made out of plastic, however it can be of different materials such as wood and metal etc, and has slidably 37 window, however it can be of different window such as fixed holes, slots etc. Horizontal rigid member 22 and 23 are connected to vertical rigid member 5 with a pivot 31, however it can be of different pivot such as snap-fit, cam lock, magnet, nut and bolt etc or can be a fixed unit. Horizontal rigid member 22 and 23 extends in width as illustrated in FIG. 1D with horizontal rigid member 23 (front perspective view), to the corresponding width of a line of text to be read, however it can be of different widths such as fixed, interchangeable etc. Plurality pointer member 11, 7, 6, 9 and 13 with a semi circle shape and made out of plastic, however it can be of different shapes such as rectangular, triangle, arrow etc and different materials such as wood, metal etc. Plurality pointer member 11, 7, 6, 9 and 13 pivot 31 vertical to upright read position from horizontal rigid member 22 and 23 as illustrated in FIG. 1E with plurality pointer member 11 and horizontal rigid member 22 (front perspective view) as directed by arrows, however it can be of different pivot such as click fit, magnet, snap-fit, cam lock etc. Plurality pointer member 11, 7, 6, 9 and 13 can slidably 37 on horizontal rigid member 22 and 23 as illustrated in FIG. 1B with horizontal rigid member 23 and plurality pointer member 9 and 13 (front perspective view) as directed by arrows, however it can be of different slidably such as in individual holes, slots etc.

The vertical rigid member 5 is typically 1 mm to 7 mm in thickness and 5 mm to 110 mm in length. The horizontal rigid member 22 and 23 are typically 3 mm to 6 mm in thickness and 50 mm to 115 mm in width. The plurality pointer member 11, 7, 6, 9 and 13 is typically 1 mm to 3 mm in thickness and 20 mm to 30 mm in length. Pivot 31 offers the user to set the pointer reading tool 20 to the line of text to be read and can change settings to different widths of lines and of different groups of plurality of words to be read.

The Colour of the plurality pointer member 11, 7, 6, 9 and 13 are green, however can be of a different colour such as red, yellow etc or can be illuminating light 49 as illustrated in FIG. 1C (front perspective view). Vertical rigid member 5 and horizontal rigid member 22 and 23 are white, however can be of a different colour such as black, blue etc or can be of a different mix of colour such as black on one side and white on the other side, however can be of a different mix of colours such as blue, orange etc.

Figure 1F:
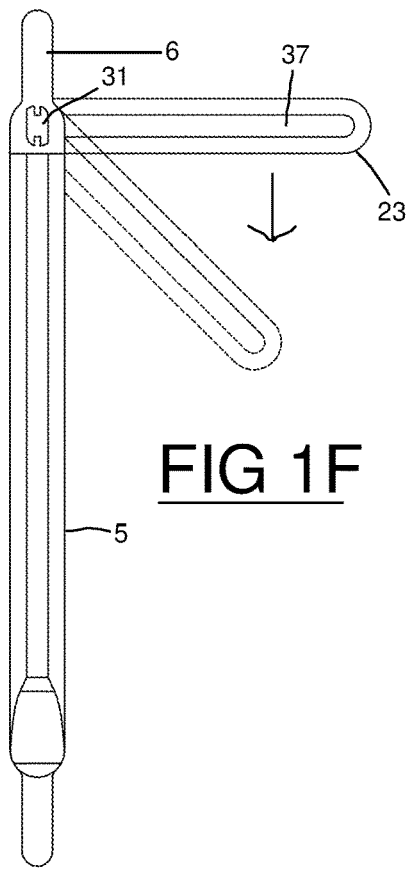
Figure 1G:
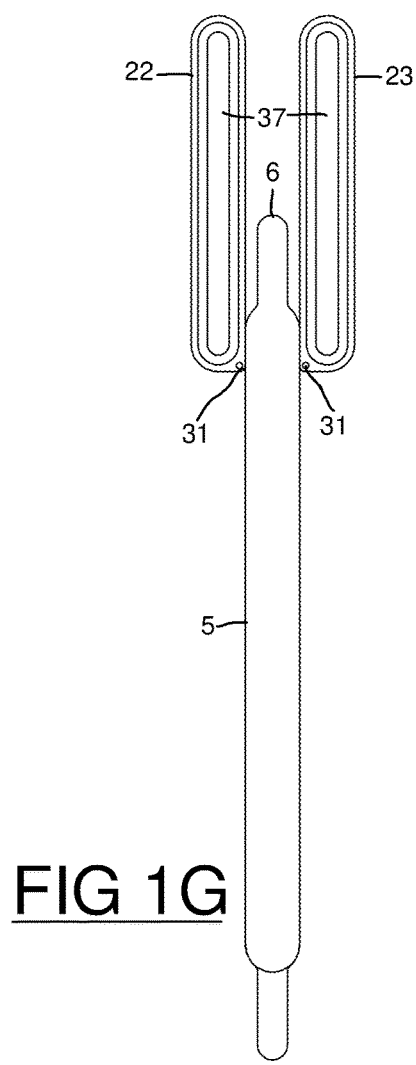

Horizontal rigid member 22 and 23 are in recess above vertical rigid member 5 as illustrated in FIG. 1G (side perspective view) when not in use, however can be of different recesses such as below as illustrated in FIG. 1F with horizontal rigid member 23 (front perspective view) moving down as directed by arrow etc.

Figure 1H:
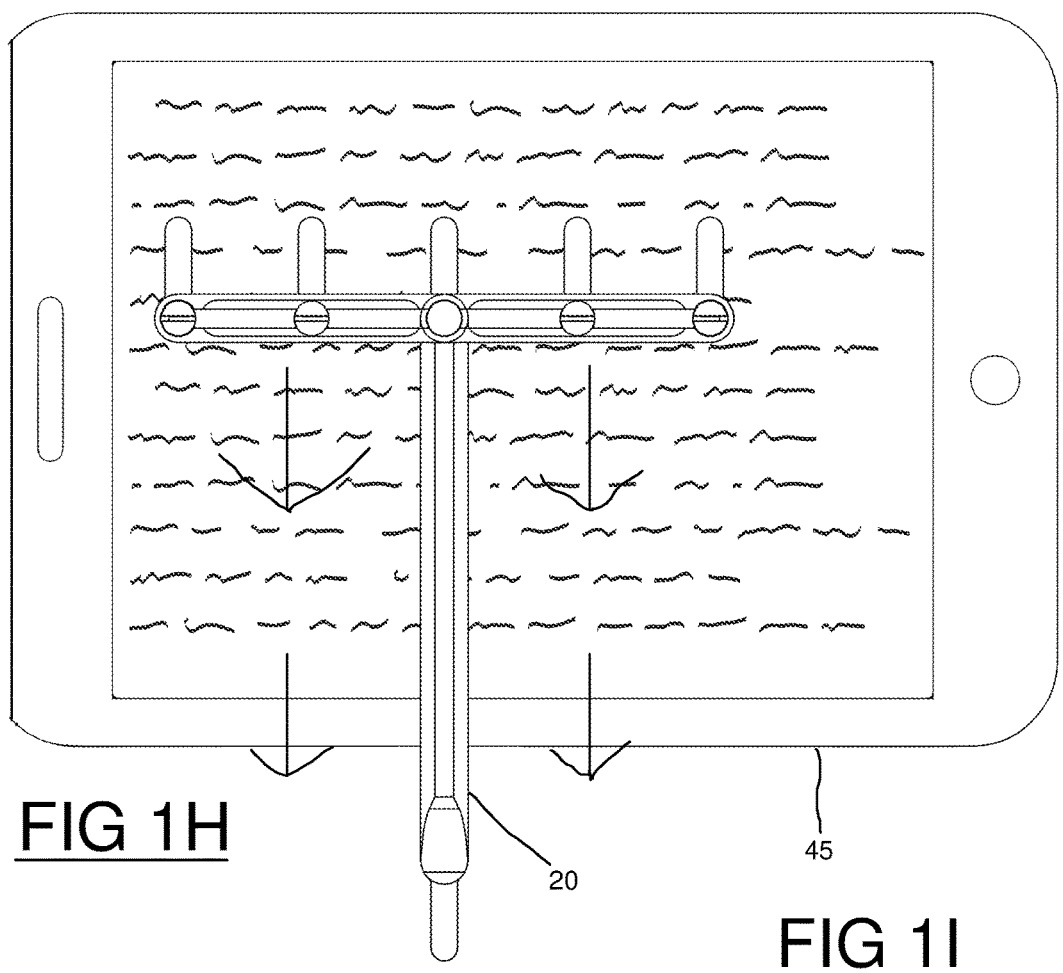
FIGS. 1H to 1I shows the perspective view of embodiment positioned on a digital screen and on a page in a book.

Pointer reading tool 20 can be used on a digital screen 45 as illustrated in FIG. 1H (front perspective view), however can be a computerised version.

Figure 1I:
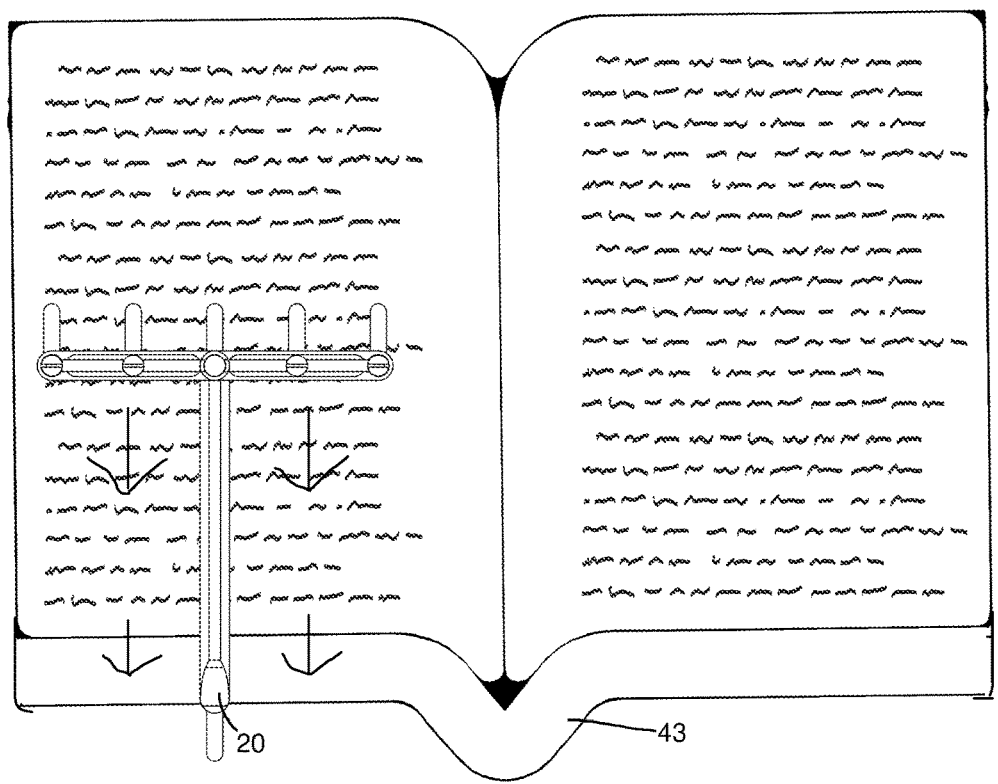

Pointer reading tool 20 will be used on any printed material such as printed books 43 as illustrated in FIG. 1I (front perspective view), however can be of different material such as papers, magazines etc.

OPERATION FIGS. 1A to 1I

By a person grasping vertical rigid member 5, pivoting horizontal rigid member 22 and 23 to a horizontal position (FIG. 1F) extended to width to a line of text and pivoting plurality pointer member 11, 7, 6, 9 and 13 (FIG. 1E) from a horizontal position to vertical position or to read position as (FIG. 1A) to group a plurality of words. Next one will set the width of horizontal rigid member 22 and 23 (FIG. 1D) to the line of text, at least one word in from the start of the line and one word in from the end of the line. Next one will set the plurality pointer member 11, 7, 6, 9 and 13 (FIG. 1B) to be evenly spaced to group a plurality of words to be read, so as to be able to read in groups of plurality of words around each individual pointer.

Once set (FIG. 1A) one will position the pointer reading tool 20 at an angle that is comfortable and one can clearly see the plurality pointer member 11, 7, 6, 9 and 13 pointer ends to the page to be read (FIG. 1I). Next, one will position the pointer reading tool 20 above or below the first line of text to be read, with the eye focused on first plurality pointer member 11, using the eye peripheral vision, reads a plurality of words on either side of plurality pointer member 11. Next, one proceeds to saccade to next plurality pointer member 7, reads a plurality of words on either side of the individual pointer with eye peripheral vision and saccades on to next individual pointer and continues thereafter between each individual pointer focusing on pointer ends and using eye peripheral vision to group a plurality of words to the end the line of text, reading as rapidly as possible without losing comprehension and training eye peripheral vision to read a group of plurality of words. The pointer reading tool 20 is moved downward respectively as per line is read as directed by arrows in (FIG. 1I).

Pointer reading tool 20 (FIG. 1A) shows the reading tool having five pointers for eyes to focus on and succade between, however you can add more pointers such as six, seven, eight etc to embodiment 20 for a beginner to learn and train to read using eye peripheral vision. As a reader becomes consistent, fluent and rapidly reading line of text by grouping a plurality of words using eye peripheral vision to read them, the reader can then reduce the number of pointers such as having six, five, four, three etc to saccade between as the eye peripheral vision expands and can read more group of plurality of words at one individual fixed point.

I developed and continue using pointer reading tool 20 starting with 5 pointers and as my skill increased by training my eye peripheral vision I have reduced the pointers to now only using 2. This gives me a better pace at which I read, increases my focus and concentration, reduces the stress, strain and fatigue of my eyes and I'm reading far more of the material I'm reading in one sitting. I'm now a more effective and efficient reader.

In the remaining figures, different embodiments of pointer reading tool 20 are illustrated, and similar parts to the pointer reading tool 20 of FIG. 1A are indicated by the same numerals.

FIGS. 2A-2B Alternate Embodiment

Second embodiment 20 of the pointer reading tool as illustrated in FIG. 2A (front perspective view) as shown in set reading position comprises of: horizontal fixed member 19 connected with snap-fit 41, however it can be of different snap-fit such as click fit, magnet, cam lock, nut and bolt etc to vertical rigid member 5 as illustrated in FIG. 2B (front perspective view) as directed by arrows. Plurality pointer member 11, 7, 9 and 13 snap-fit 41 into slot 1 on horizontal rigid member 19 as illustrated in FIG. 2B with plurality pointer member 13 (front perspective view) as directed by arrow, however it can be of different snap-fit such as click fit, magnet, cam lock etc and can be of different slots such as hole, window etc.

Operation FIG. 2A-2B

By a person grasping vertical rigid member 5, connecting horizontal fixed member 19 with snap-fit 41 and connecting plurality pointer member 11, 7, 9 and 13 with snap-fit 41 to read position (FIG. 2A). Next, one will set the plurality pointer member 11, 7, 9 and 13 to be spaced on horizontal fixed member 19 to group a plurality of words to be read. Next, one will read in groups of plurality of words around each individual plurality pointer with eye peripheral vision to the end of a line of text, saccading between each individual plurality pointer to group plurality of words and moves pointer reading tool 20 downwards respectively to next line of text to be read to continue the same process.

FIGS. 3A-3C Additional Embodiment

Third embodiment 20 of the pointer reading tool as illustrated in FIG. 3A (front perspective view) comprises of: vertical rigid member 5 with slidably 51 and fixed plurality pointer member 6. Horizontal rigid member 22 and 23 are connected to vertical rigid member 5 with a cam lock 47, however it can be different such as nut & bolt, twist & lock etc. Plurality pointer member 11 and 13 pivot 31 from horizontal rigid member 22 and 23 as illustrated in FIG. 3B with plurality pointer member 13 and horizontal rigid member 23 (front perspective view) as directed by arrows. Horizontal rigid member 22 and 23 slidably 51 with cam lock 47 from vertical rigid member 5 to set read position as illustrated in FIG. 3C (front perspective view) as directed by arrows.

Operation FIG. 2A

By reader grasping vertical rigid member 5, pushing cam lock 47 for horizontal rigid member 22 and 23 to width of line of text. Next one will set the plurality pointer member 11 and 13 to be spaced on horizontal rigid member 22 and 23 to group a plurality of words to be read. Next one will read in groups of plurality of words around each individual plurality pointer with eye peripheral vision to the end of a line of text, succading between each individual plurality pointer to group plurality of words and moves pointer reading tool 20 downwards respectively to next line of text to be read to continue the same process.

Advantages

From the description above, several advantages of some embodiments of my pointer reading tool 20 become evident:
  (a) Having a plurality of individual visual pointers for eyes to focus on and saccade between when reading to group a plurality of words.
  (b) Reduces saccades a person's eyes have to make when reading a line of text.
  (c) Simple to use, inexpensive to manufacture and easy to carry.
  (d) Plurality of individual pointers trains a person's peripheral vision to read a plurality of words around each individual pointer.
  (e) To increase pointers as a beginner learning to train and read with eye peripheral vision and to reduce pointers as more advanced a person gets reading with eye peripheral vision.
  (f) Movable to the width of any page or screen and can be used on a digital screen as a computerised version.
  (g) Increases focus and concentration.
  (h) Reduces eye stress, strain and fatigue when reading.
  (i) Controls pace of reading.
  (j) Develops a new reading habit.
  (k) Movable individual pointers to group a plurality of words to be read and saccade between.
  (l) Keeps the mind engaged in what a person is reading.
  (m) Any age and ability can learn and train.
  (n) Develops effective and efficient reading.
  (o) Teaches to read in a group of plurality of words with one fixed point to focus on.

Conclusion, Ramifications, and Scope

Accordingly, the reader will see that the pointer reading tool of various embodiments can be used to learn and train a person's eye peripheral vision by focusing the eye to read in groups of plurality of words on a line of text. By focusing eye around each individual pointer, will train the eye peripheral vision to read in a group of words around an individual pointer, lowering saccade points the eye has to make, that can be used of any material that can be read, making it effective to group a plurality of words and efficient to read through any material. In addition, a person will be able to read a page of text at pace, with greater focus and concentration on what's been read whilst reducing stress, strain and fatigue of their eyes when reading. Furthermore, the pointer reading tool has additional advantages:

It provides a bookmark for written material to pick up where a person left off
  It provides pointer reading tool that can extend in length to read on a computer screen
  It provides a teacher to use on any given surface of material to teach grouping words at one fixation point It allows a online course to teach grouping plurality of words together by breaking down the steps to achieve effective and efficient reading with eye peripheral vision It allows a person to increase the plurality of individual pointers to group a plurality of words as you start and can decrease as the eye peripheral vision is trained to read more groups of plurality of words around each individual pointers It allows the grouping of numbers on a line to be read at one fixation point It permits the use of having a magnifier lens to plurality of individual pointers for a person with poor eyesight and It permits the use of having a coloured lens for person with visual stress syndrome (Irlens syndrome)

Although the description above contains many specificities, these should not be construed as limiting the scope of embodiments but as merely providing illustrations of some of several embodiments. A person skilled in the art can generate additional embodiments, changes or modifications without exceeding the scope or departing for the spirit of the claimed invention.

Thus the scope of the embodiments should be determined by the appended claims and their legal equivalents, rather than examples given.

I claim:

1. A pointer reading tool comprising:
   (a) a substrate with at least one line of text disposed thereon,
   (b) a horizontal member sufficient in width to span said at least one line of text and sufficient in depth to accommodate a plurality of vertical individual pointers,
   (c) a plurality of vertical individual pointers of substantially equal lengths and configured to group a plurality of words when reading said line of text, and
   (d) a means for mounting said vertical individual pointers to said horizontal member;
   whereby the tool is configured to allow a user to space said plurality of vertical individual pointers along the horizontal member to group the plurality of words on the line of text, and to enable the user to focus on said plurality of words and saccade between said plurality of vertical individual pointers while reading the line of text.

2. The pointer reading tool of claim 1, further comprising a vertical support member mounted to the horizontal member and configured to be held by a hand of the user, whereby the user's hand can move said vertical support member in a plurality of directions.

3. The pointer reading tool of claim 2 wherein said vertical support member is fixedly mounted to said horizontal member.

4. The pointer reading tool of claim 1 wherein said horizontal member has a width corresponding to that of said line of text.

5. The pointer reading tool of claim 1 wherein said horizontal member has a fixed width corresponding to that of said line of text.

6. The pointer reading tool of claim 1 wherein said plurality of vertical individual pointers are mounted to said horizontal member via snap-fit connections.

7. The pointer reading tool of claim 1, further comprising a means for illuminating each of said plurality of vertical individual pointers.

* * * * *